US007178140B2

(12) United States Patent
Dmitriev (10) Patent No.: US 7,178,140 B2
(45) Date of Patent: *Feb. 13, 2007

(54) SPEEDING UP APPLICATION DOWNLOADING FROM A REMOTE SERVER

(75) Inventor: Mikhail Dmitriev, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 702 days.

This patent is subject to a terminal disclaimer.

(21) Appl. No.: 10/159,919

(22) Filed: May 31, 2002

(65) Prior Publication Data

US 2003/0163506 A1    Aug. 28, 2003

Related U.S. Application Data

(63) Continuation-in-part of application No. 10/086,387, filed on Feb. 28, 2002.

(51) Int. Cl.
    G06F 9/44     (2006.01)
    G06F 9/45     (2006.01)
(52) U.S. Cl. .................. 717/166; 162/163; 162/167; 162/118
(58) Field of Classification Search ........ 717/100–178; 709/201, 315; 707/204
    See application file for complete search history.

(56) References Cited

U.S. PATENT DOCUMENTS

| 5,778,234 | A | 7/1998 | Hecht et al. ............... 395/712 |
| 5,974,454 | A | 10/1999 | Apfel et al. ............... 709/221 |
| 6,052,531 | A | 4/2000 | Waldin, Jr. et al. ......... 395/712 |
| 6,106,570 | A * | 8/2000 | Mizuhara ................... 717/169 |
| 6,339,841 | B1 * | 1/2002 | Merrick et al. ............. 717/166 |
| 6,480,880 | B2 * | 11/2002 | White et al. ................ 709/201 |
| 6,493,870 | B1 * | 12/2002 | Madany et al. ............. 717/165 |
| 6,535,894 | B1 * | 3/2003 | Schmidt et al. ............. 707/204 |
| 2002/0129340 | A1 * | 9/2002 | Tuttle ....................... 717/132 |
| 2002/0144011 | A1 * | 10/2002 | Hinsley ..................... 709/315 |
| 2004/0083474 | A1 * | 4/2004 | McKinlay et al. .......... 717/176 |

* cited by examiner

Primary Examiner—Kakali Chaki
Assistant Examiner—Insun Kang
(74) Attorney, Agent, or Firm—Gunnison, McKay & Hodgson, L.L.P.

(57) ABSTRACT

Less data to transmit from a server to a virtual machine on a client is achieved by transmitting only those methods of classes that the executed application actually requires. This is accomplished by taking the classes of the targeted application and statically determining which methods of these classes, as well as of the library classes, can actually be used by the application. A method usage map of usable methods for each class is saved in a file. When the request to download is received from the client, the server consults this map and selectively transmits only those methods that are in it. This saves download time and memory space in the virtual machine and speeds up execution.

44 Claims, 4 Drawing Sheets

SPEEDING UP APPLICATION DOWNLOADING FROM A REMOTE SERVER

CROSS-REFERENCE TO RELATED APPLICATION

The present application is a continuation-in-part of co-pending application Ser. No. 10/086,387, filed Feb. 28, 2002, by Mikhail Dmitriev, entitled "REDUCING THE MEMORY FOOTPRINT OF APPLICATIONS EXECUTED IN A VIRTUAL MACHINE".

FIELD OF THE INVENTION

The present invention relates to the field of virtual machines. More particularly, the present invention relates to speeding up application downloading from a remote server through a virtual machine.

BACKGROUND OF THE INVENTION

Applications executed on a computer may be stored locally, such as on a disk or other secondary storage device attached to the computer. Alternatively, they may be stored on a remote server. In the latter case, the binary code of the application is transmitted over the network from the server machine, on which the code is stored, to the client machine, which executes the code. The binary code for the given application may be transmitted from the server to the client every time the application is to be executed, or it may be transmitted once and saved locally for subsequent executions.

The network is usually the bottleneck in terms of speed in the server-network-client chain. If the client machine connects to the Internet using a modem and a telephone line, or a slow wireless network, then delays in downloading time are plentiful. Because of this bottleneck, most of the time it takes to download an application is taken up by network delays.

In computer science, a virtual machine is software that acts as an interface between compiler binary code and the microprocessor (or other hardware platform) that actually performs the machine's instructions. This allows software written for a particular platform to be run on any platform compatible with the virtual machine, without the need for code to be rewritten or recompiled by the programmer for each separate platform. Java Virtual Machine™ (Java VM) from Sun Microsystems of Palo Alto, Calif. is an example of a virtual Machine. Once a Java VM has been provided for a platform, any Java program can run on that platform.

If an application executed by a virtual machine is written in an object-oriented language, the executable code of the application typically takes the form of a number of classes that the virtual machine loads in memory and executes. Classes are normally loaded by the VM individually and lazily in that each class is loaded only at the time when the executed application needs it, which may be much later than when the application starts. Again, the Java language and its implementation are an example of this. The Java implementation defines applets, which are applications whose binary code is downloaded by the client JVM from the server before each invocation. Alternatively, it is possible to store a Java application on a server, then download it onto a client machine (manually or using a special installation program) and subsequently execute this local copy of the application as many times as needed.

A class in an object-oriented language can be defined in multiple ways, but for the purposes of this application a class is defined as a collection of methods. A method, in turn, is a chunk of executable code that can be called (or executed) by other methods from its own class or other classes.

Applications executed by a virtual machine often make the virtual machine load many classes, each containing numerous methods. This is typically due to the fact that library classes are used extensively. A library is a (typically large) collection of classes that implement some common functionality. The so-called core classes defined in the Java language implementation is an example of a class library. While libraries provide convenience for the programmer, allowing them to utilize readily available classes instead of writing the necessary code themselves, they may also waste memory space and processor time. This is due to the fact that only a fraction of methods contained in a typical library class are actually used, i.e., called directly or indirectly by the application code. Nevertheless, the virtual machine dynamically loads into memory a complete representation of each class, even if only one method of this class is actually used. As a result, a significant amount of main memory is wasted at run time. Additionally, virtual machines typically manage memory automatically by performing garbage collection, during which objects in memory are moved around. Thus, the more wasted space utilized in memory, the more time needed to manage it.

Figure 1:
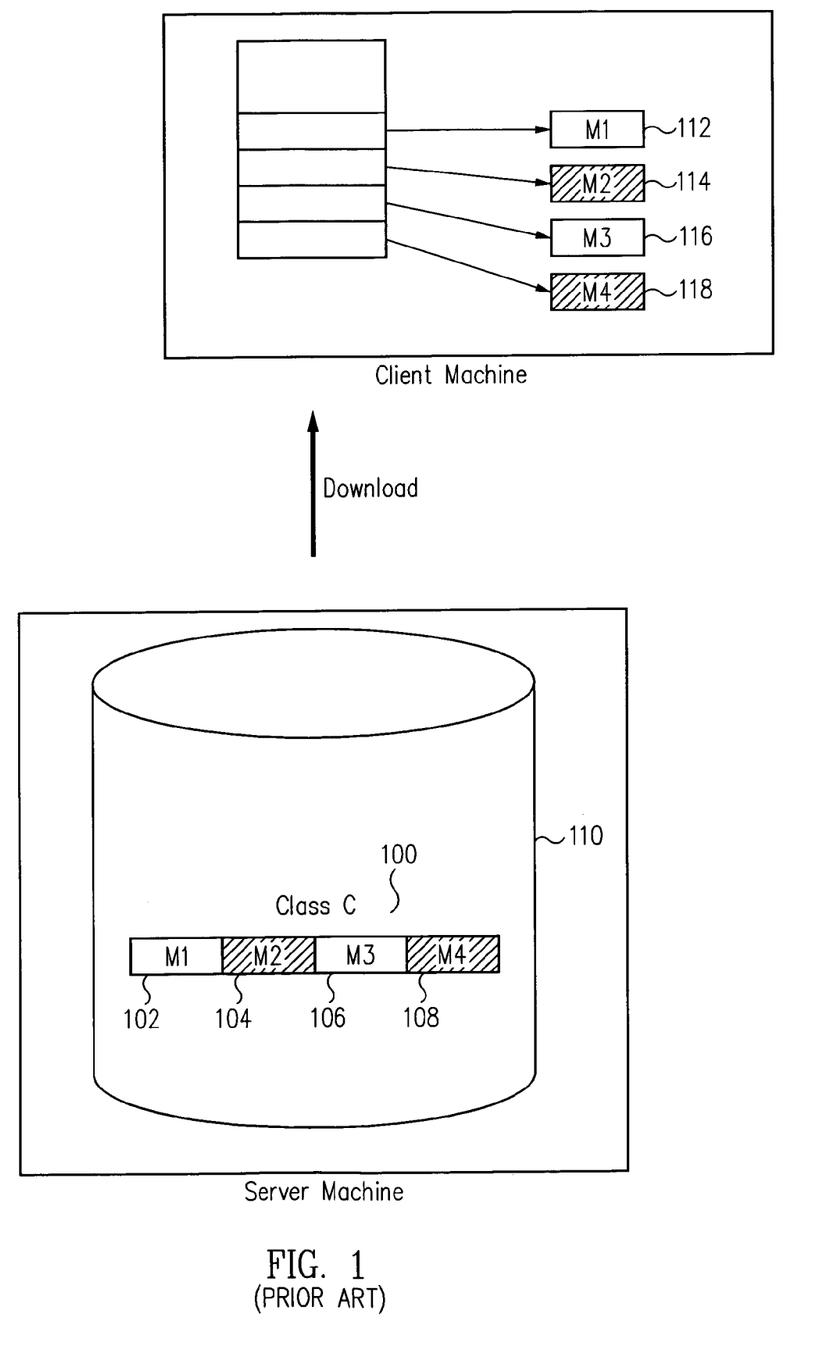
FIG. 1 is a diagram illustrating an example of how a conventional virtual machine loads classes from a remote server.

FIG. 1 is a diagram illustrating an example of how a virtual machine is typically loaded with classes from the remote server. Class C 100 has four methods, M1 102, M2 104, M3 106, and M4 108. Class C 100 is contained on disk 110 on the server machine. Upon request, the server transmits all four methods M1 112, M2 114, M3 116, and M4 118 to the virtual machine on the client. However, perhaps only M2 and M4 are referenced in the application code (methods which are referenced in the application code are indicated as such by shading). Therefore, this solution causes the virtual machine to unnecessarily download and load M1 and M3, which slows execution and wastes bandwidth and memory space.

What is needed is a solution that reduces the size and speed drawbacks of loading complete classes into virtual machines.

BRIEF DESCRIPTION OF THE INVENTION

Less data to transmit from a server to a virtual machine on a client is achieved by transmitting only those methods of classes that the executed application actually requires. This is accomplished by taking the classes of the targeted application and statically determining which methods of these classes, as well as of the library classes, can actually be used by the application. A method usage map of usable methods for each class is saved in a file. When the request to download is received from the client, the server consults this map and selectively transmits only those methods that are in it. This saves download time and memory space in the virtual machine and speeds up execution.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A specific embodiment of the present invention may be executed using a Java™ Virtual Machine created by Sun Microsystems, Inc. of Palo Alto, Calif. However, one of ordinary skill in the art will recognize that the present invention may be implemented using a variety of different systems and need not be limited to specific examples provided in this document.

In a specific embodiment of the present invention, execution of an application by a virtual machine on a client results in less data transmitted over the network by downloading only those methods of classes that the executed application actually requires. This is accomplished by the server taking the classes of the targeted application and statically determining which methods of these classes, as well as of the library classes, can actually be used by the application. A generated method usage map of usable methods for each class is saved on the server. At runtime, the server consults this file and selectively sends only those methods listed in the file to the client for execution on the virtual machine.

Figure 2:
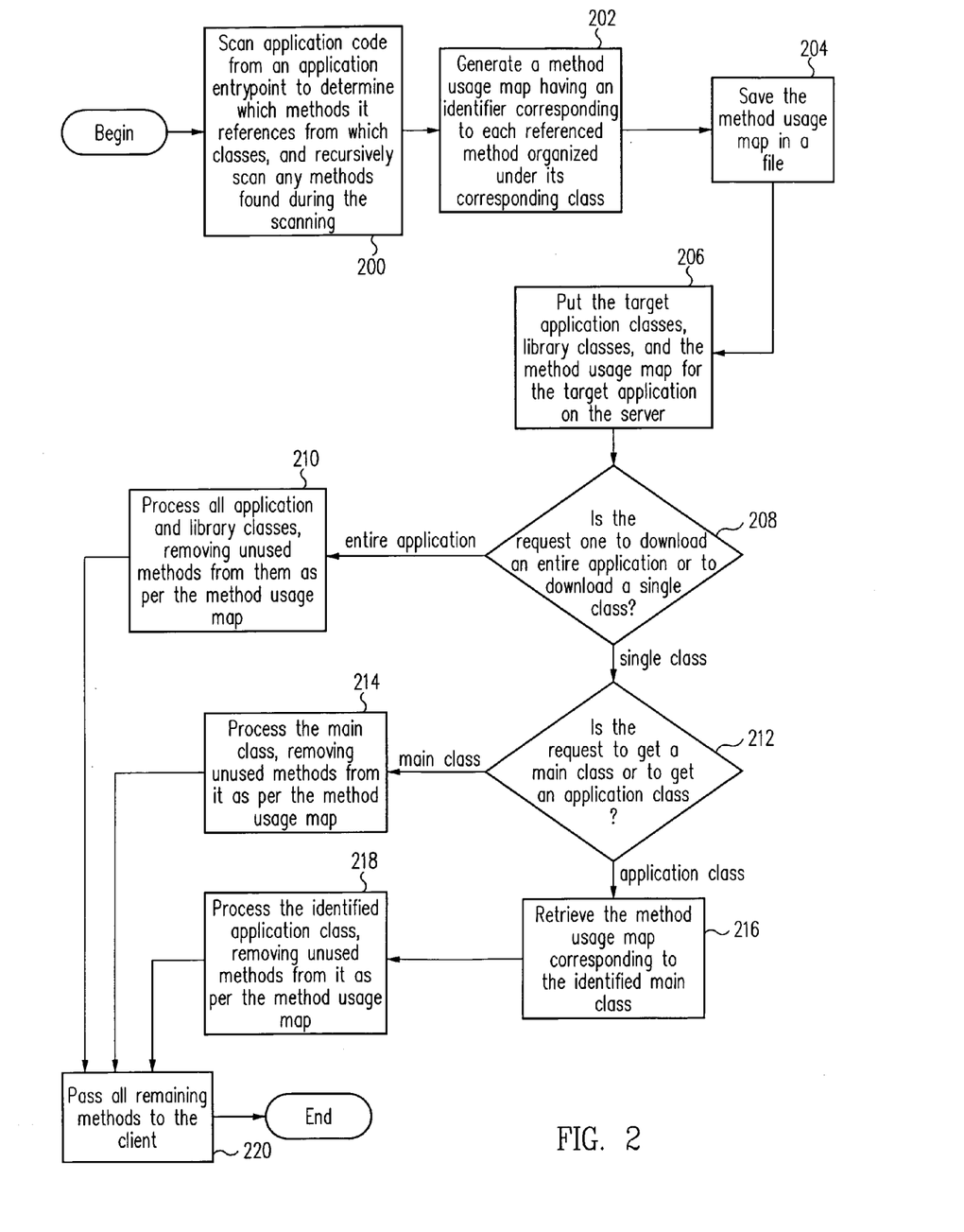
FIG. 2 is a flow diagram illustrating a method for loading methods into a virtual machine, the methods contained in one or more classes, in accordance with a specific embodiment of the present invention.

FIG. 2 is a flow diagram illustrating a method for transmitting methods to a client running a virtual machine, the methods contained in one or more classes, in accordance with a specific embodiment of the present invention. At 200, application code is scanned from an application entrypoint to determine which methods it references from which classes, and any methods found during the scanning are recursively scanned as well. This produces a transitive closure of all methods that may be called during execution of the application and their corresponding classes. This scanning may be accomplished in such a way that it handles method polymorphism, wherein a method is implemented multiple times within a class and its subclasses. At 202, a method usage map is generated having an identifier for each referenced method organized under its corresponding class. In a specific embodiment of the present invention the identifier may simply be the method name, however other implementations are possible. At 204, the method usage map is saved in a file. At 206, the target application classes, library classes, and the method usage map for the target application are then put on the server. The target application's main class and the method usage map for the application should somehow be associated to each other. For example, the files for the two should be assigned the same name, with different extensions.

When the application is executed by a client, the server consults the method usage map in the file. This actually may occur when the request to download is received. There may be two different types of requests: (1) a request to download an entire application to be stored locally; or (2) a request to download a single class. Therefore, at 208 the server determines which type of request has been received. If it is the first type, at 210 the server processes all application and library classes, removing unused methods from it as per the method usage map. If the request is of the second type, this implies that lazy downloading of classes is being attempted, as used in the Java applet. That is, the client virtual machine is first requesting the main class from the server, and then requests other required classes, one by one. Taking into account the fact that several applications may reuse the same class, but actually use different methods from it, each request for a class may be accompanied by the main class name (or other unique ID, such as the method usage map name) of the application in whose context this class is to be executed. This is to allow the server to correctly determine which methods of the given class are needed in the context of the given request. In a specific embodiment of the present invention, two different subtypes of the "request to download a single application class" type may be provided. The first subtype is a request to "get main class" and has a single parameter (the class name). The second subtype is a request to "get application class" and has two parameters (class name and main class name or other parameter identifying the method usage map to use).

Thus, at 212, the server determines whether the subtype of the request is "get main class" or "get application class". If it is "get main class", at 214 the server processes the main class, removing unused methods from it as per the method usage map. If it is "get application" class, at 216 the server retrieves the method usage map corresponding to the identified main class, and then at 218 processes the identified application class, removing unused methods from it as per the method usage map. At 220, all remaining methods are passed to the client. Thus, the server winds up only sending methods that may be needed for execution. This may significantly reduce the footprint in memory on the client side and speed up execution and download time. This also provides the advantage that, while unnecessary methods contained in classes are not loaded into the virtual machine, they are still stored on the server (along with the method usage map). Thus methods of some class C that are not used by client A may be used by another client B and vice versa (that is the common situation if C is a library class). While both clients use the same class, each of them will keep its network traffic and memory footprint down to the necessary minimum.

Figure 3:
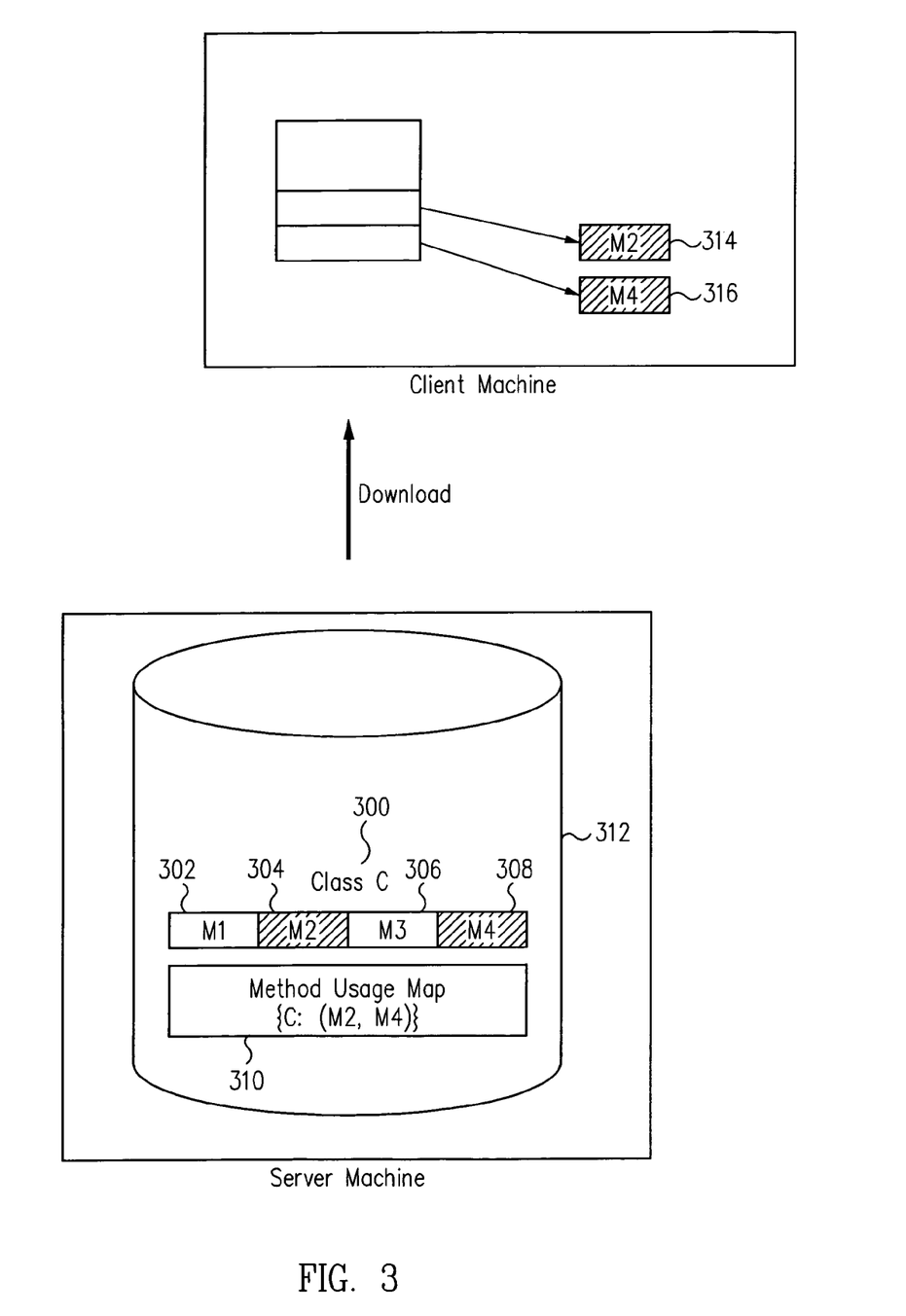
FIG. 3 is a block diagram illustrating an example of the execution of the method of FIG. 2 in accordance with a specific embodiment of the present invention.

FIG. 3 is a block diagram illustrating an example of the execution of the method of FIG. 2 in accordance with a specific embodiment of the present invention. Class C 300 contains four methods, M1 302, M2 304, M3 306, and M4 308. An application may then be scanned and it may be determined that only M2 304 and M4 308 are referenced in the application code (M2 304 and M4 308 are shaded to indicate that they are referenced in the application). Then a method usage map 310 is generated organized by class (the only class here is C, thus C:) with entries for the referenced methods in each class (here, M2 and M4). The method usage map 310 and the class 300 are stored on server 312.

When the virtual machine runs, the server consults the method usage map 310 stored in the database 312 and discovers that class C is referenced. It further finds that within class C, only M2 and M4 are referenced. Therefore, it only transmits M2 314 and M4 316 to the client for loading in the virtual machine. Any method within any class that is not referenced is not sent.

Figure 4:
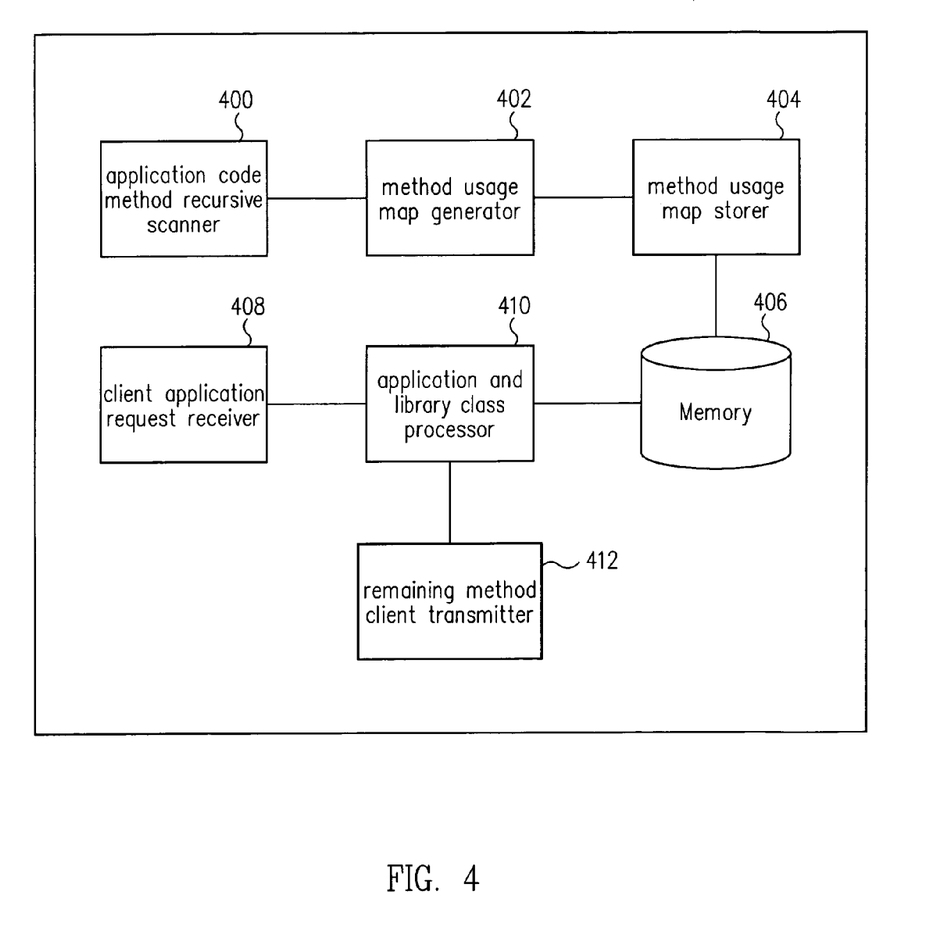
FIG. 4 is a block diagram illustrating an apparatus for loading methods into a virtual machine, the methods contained in one or more classes, in accordance with a specific embodiment of the present invention.

FIG. 4 is a block diagram illustrating an apparatus for transmitting methods to a client running a virtual machine, the methods contained in one or more classes, in accordance with a specific embodiment of the present invention. An application code method recursive scanner 400 scans application code from an application entrypoint to determine which methods it references from which classes, and any methods found during the scanning are recursively scanned as well. This produces a transitive closure of all methods that may be called during execution of the application and their corresponding classes. This scanning may be accomplished in such a way that it handles method polymorphism, wherein a method is implemented multiple times within a class and its subclasses. A method usage map generator 402 coupled to the application code method recursive scanner 400 generates a method usage map having an identifier for each referenced method organized under its corresponding class. In a specific embodiment of the present invention the identifier may simply be the method name, however other implementations are possible. A method usage map storer 404 coupled to the method usage map generator 402 and to a memory 406 saves the method usage map in a file in the memory 406. The target application classes, library classes, and the method usage map for the target application are then put on the server. The target application's main class and the method usage map for the application should somehow be associated to each other. For example, the files for the two should be assigned the same name, with different extensions.

When the application is executed by a client, it generates a request to the server. A client application request receiver 408 receives the request. There may be two different types of requests: (1) a request to download an entire application to be stored locally; or (2) a request to download a single class. Therefore, the server may include a client class request receiver instead of or in addition to the client application request receiver 408. If it is the first type, an application and library class processor 410 coupled to the client application request receiver 408 and to the memory 406 processes all application and library classes, removing unused methods from it as per the method usage map. If the request is of the second type, this implies that lazy downloading of classes is being attempted, as used in the Java applet. That is, the client virtual machine is first requesting the main class from the server, and then requests other required classes, one by one. Taking into account the fact that several applications may reuse the same class, but actually use different methods from it, each request for a class may be accompanied by the main class name (or other unique ID, such as the method usage map name) of the application in whose context this class is to be executed. This is to allow the server to correctly determine which methods of the given class are needed in the context of the given request. In a specific embodiment of the present invention, two different subtypes of the "request to download a single application class" type may be provided. The first subtype is a request to "get main class" and has a single parameter (the class name). The second subtype is a request to "get application class" and has two parameters (class name and main class name or other parameter identifying the method usage map to use).

Thus, the server determines whether the subtype of the request is "get main class" or "get application class" using a method usage map determiner coupled to the client class request receiver. If it is "get main class', the server processes the main class, removing unused methods from it as per the method usage map using the application and library class processor 410. If it is "get application class", the server retrieves the method usage map corresponding to the identified main class, and then processes the identified application class, removing unused methods from it as per the method usage map using the application and library class processor 410. A remaining method transmitter 412 coupled to the application and library class processor 410 passes all remaining methods to the client. Thus, the server winds up only sending methods that may be needed for execution. This may significantly reduce the amount of data transmitted over the network and the footprint in memory on the client side and speed up execution and download time. This also provides the advantage that, while unnecessary methods contained in classes are not loaded into the virtual machine, they are still stored on the server (along with the method usage map). Thus methods of some class C that are not used by client A may be used by another client B and vice versa (that is the common situation if C is a library class). While both clients use the same class, each of them will keep its network traffic and memory footprint down to the necessary minimum.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for transmitting methods to a client running a virtual machine, the methods contained in one or more classes, the method comprising:

recursively scanning through application code beginning at an application entrypoint to determine which methods may be called and the classes to which they correspond wherein, said recursively scanning includes:

finding all methods referenced in said application code; and finding all methods referenced in said methods referenced in said application code;

generating a method usage map having an identifier corresponding to all said referenced methods organized under its corresponding class;

storing said identifiers corresponding to all said methods referenced in said application code and all said methods referenced in said methods referenced in said application code in said method usage map organized by said classes;

receiving a request for an application from a client;

processing all application and library classes for the application specified by the request, after consulting said method usage map upon execution of the virtual machine, removing unused methods that are not contained in said method usage map from it as per said method usage map; and transmitting any remaining methods to the client running the virtual machine.

2. The method of claim 1, wherein said storing includes storing said method usage map in a file on a server.

3. The method of claim 2, wherein each of the classes is stored on said server.

4. The method of claim 1, wherein said recursively scanning includes statically determining which methods of the classes may actually be used by the application.

5. The method of claim 1, wherein said recursively scanning includes handling method polymorphism.

6. A method for transmitting methods to a client running a virtual machine, the methods contained in one or more classes, the method comprising:

recursively scanning through application code beginning at an application entrypoint to determine which methods may be called and the classes to which they correspond wherein, said recursively scanning includes:

finding all methods referenced in said application code; and finding all methods referenced in said methods referenced in said application code; and generating a method usage map having an identifier corresponding to all said referenced methods organized under its corresponding class;

storing said identifiers corresponding to all said methods referenced in said application code and all said methods referenced in said methods referenced in said application code in said method usage map organized by said classes;

receiving a request for a class from a client;

determining which method usage map to use by examining said request;

processing said class specified by the request, after consulting said method usage map upon execution of the virtual machine, removing unused methods that are not contained in said method usage map from it as per said method usage map; and transmitting any remaining methods to client running the virtual machine.

7. The method of claim 6, wherein said request for the class may be either a request for a main class or a request for an application class.

8. The method of claim 7, wherein if said request for the class is the request for the main class, said determining comprises using a method usage map corresponding to said main class.

9. The method of claim 8, wherein said method usage map corresponding to said main class shares the same name as said main class.

10. The method of claim 7, wherein if said request for the class is the request for the application class, said request also includes a main class name.

11. The method of claim 10, wherein if said request for the class is the request for the application class, said determining comprises using a method usage map corresponding to said main class name.

12. The method of claim 11, wherein said method usage map corresponding to said main class shares the same name as said main class.

13. The method of claim 6, wherein said storing includes storing said method usage map in a file on a server.

14. The method of claim 13, wherein each of the classes is stored on said server.

15. The method of claim 6, wherein said recursively scanning includes statically determining which methods of the classes may actually be used by the application.

16. The method of claim 6, wherein said recursively scanning includes handling method polymorphism.

17. A method for transmitting methods to a client running a virtual machine, the methods contained in one or more classes, the method comprising:

receiving a request for a class from a client;

determining which method usage map to use by examining said request, the chosen method usage map having been created by;

recursively scanning through application code beginning at an application entry point to determine which methods may be called and the classes to which they correspond wherein, said recursively scanning includes:

finding all methods referenced in an application code; and finding all methods referenced in said methods referenced in said application code; and generating a method usage map having an identifier corresponding to all said referenced methods organized under its corresponding class;

storing said identifiers corresponding to all said methods referenced in said application code and all said methods referenced in said methods referenced in said application code in said method usage map organized by said classes;

processing said class specified by the request, after consulting said method usage map upon execution of the virtual machine, removing unused methods that are not contained in said method usage map from it as per said method usage map; and transmitting any remaining methods to the client running the virtual machine.

18. The method of claim 17, wherein said request for the class may be either a request for a main class or a request for an application class.

19. The method of claim 18, wherein if said request for the class is the request for the main class, said determining comprises using a method usage map corresponding to said main class.

20. The method of claim 19, wherein said method usage map corresponding to said main class shares the same name as said main class.

21. The method of claim 18, wherein if said request for the class is the request for the application class, said request also includes a main class name.

22. The method of claim 21, wherein if said request for the class is the request for the application class, said determining comprises using a method usage map corresponding to said main class name.

23. The method of claim 22, wherein said method usage map corresponding to said main class shares the same name as said main class.

24. An apparatus for transmitting methods to a client running a virtual machine, the methods contained in one or more classes, the apparatus comprising:
    means for recursively scanning through application code beginning at an application entrypoint to determine which methods may be called and the classes to which they correspond wherein, said recursively scanning includes:
    finding all methods referenced in said application code; and
    finding all methods referenced in said methods referenced in said application code;
    generating a method usage map having an identifier corresponding to all said referenced methods organized under its corresponding class;
    means for storing said identifiers corresponding to all said methods referenced in said application code and all said methods referenced in said methods referenced in said application code in said method usage map organized by said classes;
    means for receiving a request for an application from a client;
    means for processing all application and library classes for the application specified by the request, after consulting said method usage map upon execution of the virtual machine, removing unused methods that are not contained in said method usage map from it as per said method usage map; and
    means for transmitting any remaining methods to the client running the virtual machine.

25. The apparatus of claim 24, wherein said means for storing includes means for storing said method usage map in a file on a server.

26. The apparatus of claim 25, wherein each of the classes is stored on said server.

27. The apparatus of claim 24, wherein said means for recursively scanning includes means for statically determining which methods of the classes may actually be used by the application.

28. The apparatus of claim 24, wherein said means for recursively scanning includes means for handling method polymorphism.

29. An apparatus for transmitting methods to a client running a virtual machine, the methods contained in one or more classes, the apparatus comprising:
    means for recursively scanning through application code beginning at an application entrypoint to determine which methods may be called and the classes to which they correspond wherein, said recursively scanning includes:
    finding all methods referenced in said application code; and
    finding all methods referenced in said methods referenced in said application code;
    generating a method usage map having an identifier corresponding to all said referenced methods organized under its corresponding class;
    means for storing said identifiers corresponding to all said methods referenced in said application code and all said methods referenced in said methods referenced in said application code in said method usage map organized by said classes;
    means for receiving a request for a class from a client;
    means for determining which method usage map to use by examining said request;
    means for processing said class specified by the request, after consulting said method usage map upon execution of the virtual machine, removing unused methods that are not contained in said method usage map from it as per said method usage map; and
    means for transmitting any remaining methods to the client running the virtual machine.

30. The apparatus of claim 29, wherein if said request for the class is a request for a main class, said means for determining comprises means for using a method usage map corresponding to said main class.

31. The apparatus of claim 30, wherein said method usage map corresponding to said main class shares the same name as said main class.

32. The apparatus of claim 29, wherein said means for storing includes means for storing said method usage map in a file on a server.

33. The apparatus of claim 32, wherein each of the classes is stored on said server.

34. The apparatus of claim 29, wherein said means for recursively scanning includes means for statically determining which methods of the classes may actually be used by the application.

35. The apparatus of claim 29, wherein said means for recursively scanning includes means for handling method polymorphism.

36. An apparatus for transmitting methods to a client running a virtual machine, the methods contained in one or more classes, the apparatus comprising:
    means for receiving a request for a class from a client;
    means for determining which method usage map to use by examining said request, the chosen method usage map having been created by;
    recursively scanning through application code beginning at an application entry point to determine which methods may be called and the classes to which they correspond wherein, said recursively scanning includes:
    finding all methods referenced in an application code; and
    finding all methods referenced in said methods referenced in said application code; and
    generating a method usage map having an identifier corresponding to all said referenced methods organized under its corresponding class;
    storing said identifiers corresponding to all said methods referenced in said application code and all said methods referenced in said methods referenced in said application code in said method usage map organized by said classes;
    means for processing said class specified by the request, after consulting said method usage map upon execution of the virtual machine, removing unused methods that are not contained in said method usage map from it as per said method usage map; and
    means for transmitting any remaining methods to the client running the virtual machine.

37. The apparatus of claim 36, wherein said request for the class may be either a request for a main class or a request for an application class.

38. The apparatus of claim 37, wherein if said request for the class is the request for the main class, said means for determining comprises means for using a method usage map corresponding to said main class.

39. The apparatus of claim 38, wherein said method usage map corresponding to said main class shares the same name as said main class.

40. The apparatus of claim 37, wherein if said request for the class is the request for the application class, said request also includes a main class name.

41. The apparatus of claim 40, wherein if said request for the class is the request for the application class, said means for determining comprises means for using a method usage map corresponding to said main class name.

42. The apparatus of claim 41, wherein said method usage map corresponding to said main class shares the same name as said main class.

43. A program storage device readable by a machine, tangibly embodying a program of instructions executable by the machine to perform a method for loading methods into a virtual machine, the methods contained in one or more classes, the method comprising:

recursively scanning through application code beginning at an application entrypoint to determine which methods may be called and the classes to which they correspond wherein, said recursively scanning includes:

finding all methods referenced in said application code; and     finding all methods referenced in said methods referenced in said application code;

generating a method usage map having an identifier corresponding to all said referenced methods organized under its corresponding class;

storing said identifiers corresponding to all said methods referenced in said application code and all said methods referenced in said methods referenced in said application code in said method usage map organized by said classes;

receiving a request for an application from a client;

processing all application and library classes for the application specified by the request, after consulting said method usage map upon execution of the virtual machine, removing unused methods that are not contained in said method usage map from it as per said method usage map; and     transmitting any remaining methods to the client running the virtual machine.

44. A program storage device readable by a machine, tangibly embodying a program of instructions executable by the machine to perform a method for loading methods into a virtual machine, the methods contained in one or more classes, the method comprising:

recursively scanning through application code beginning at an application entrypoint to determine which methods may be called and the classes to which they correspond wherein, said recursively scanning includes:

finding all methods referenced in said application code; and     finding all methods referenced in said methods referenced in said application code;

generating a method usage map having an identifier corresponding to all said referenced methods organized under its corresponding class;

storing said identifiers corresponding to all said methods referenced in said application code and all said methods referenced in said methods referenced in said application code in said method usage map organized by said classes,     receiving a request for a class from a client;

determining which method usage map to use by examining said request;

processing said class specified by the request, after consulting said method usage map upon execution of the virtual machine, removing unused methods that are not contained in said method usage map from it as per said method usage map; and     transmitting any remaining methods to the client running the virtual machine.

\* \* \* \* \*